June 28, 1927.

H. B. TYLER 1,633,717

AUTOMOBILE HEATER

Filed Nov. 22, 1923

Herbert B. Tyler, Inventor

By N. S. Amstutz

Attorney

June 28, 1927.
H. B. TYLER
AUTOMOBILE HEATER
Filed Nov. 22, 1923
1,633,717
2 Sheets-Sheet 2
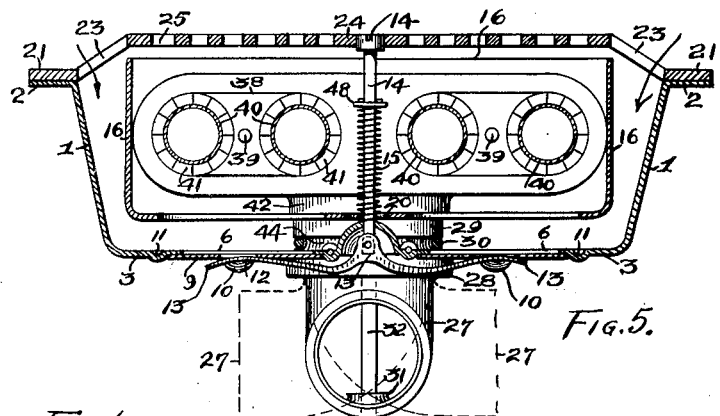

Patented June 28, 1927.

1,633,717

UNITED STATES PATENT OFFICE.

HERBERT B. TYLER, OF VALPARAISO, INDIANA.

AUTOMOBILE HEATER.

Application filed November 22, 1923. Serial No. 676,452.

My invention relates to improvements in automobile heaters and it more especially consists of the special features referred to in the annexed claims.

The purpose of my invention is to provide a heater for automobiles that is compact and self-contained; that is easily installed; that is simple in construction; that radiates a maximum quantity of heat; that is readily dissembled for cleaning whenever necessary; that provides clean-out doors; that combines an outer casing with an inner pan which contains the heat radiating element in such a way that the one can be removed from the other without dismembering the heating element; and that admits cold air between the casing and pan through a floor grating and delivers it heated through the center of the grating.

With these and other ends in view, I illustrate in the accompanying drawing such instances of adaptation as will disclose the broad underlying features without limiting myself to the specific details shown thereon and described herein.

Fig. 4 is a top plan view of the inner pan.

Fig. 5 is a cross section of Fig. 2 on line 5—5.

Fig. 7 is an enlarged plan view of one end of the casing.

Fig. 8 is a side elevation at B of a radiating tube and an end elevation at A.

Fig. 9 is an enlarged section in elevation showing the means for assembling the elbows, casing, pan and heater element heads.

Fig. 10 is a diagrammatic side elevation of a heater connected to the exhaust pipe of the engine and a floor control.

Figure 1:
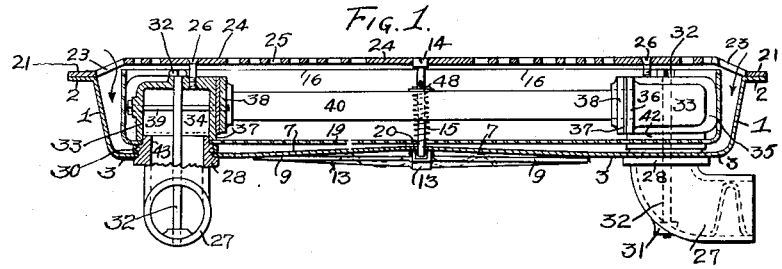
Figure 1 is a side elevation in section.

An outstanding feature of my invention is found in the fact that I simply use an outside casing 1, an inside pan 16 both formed of sheet metal stamping, a heating element in said pan, a grating cover 21, adjustable elbows 27, and two bolts 32 to hold the casing 1, pan 16, heating element heads 33, and elbows 27 in assembled relation, and in addition screws 26 hold the grating 21 assembled above the other parts. From this it will be seen that my heater is extremely simple because there are so few major parts used in its construction.

Figure 2:
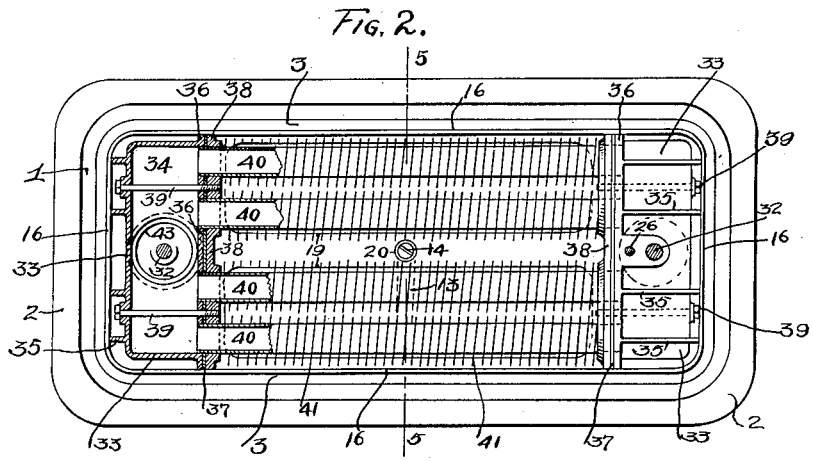
Fig. 2 is a top plan view partly in section, showing the floor grating removed.
Figure 3:
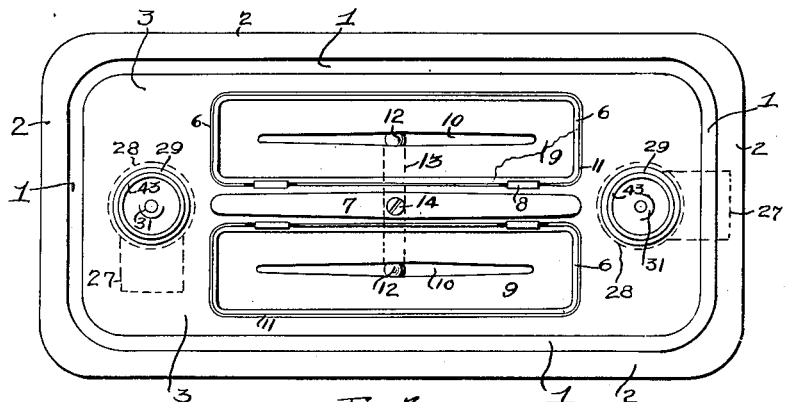
Fig. 3 is a top plan view of the outer casing detached from the rest of the heater.

In the main, I do not limit myself to the specific form of heating element which I have instanced in the drawings because changes in the structure may be made so as to constitute the heating element a single one-piece unit instead of being made up of separate heads 33, tube plates 38, and radiating tubes 40, as shown in Figs. 1, 2 and 5.

The side and end walls of casing 1 may be more or less beveled as shown in Figs. 1 and 5. These walls terminate in a flange 2 at the top of the casing and they are joined together by a bottom portion 3. Circular holes 4 are formed in the bottom 3 near each end which are of a slightly larger diameter lengthwise of the casing than crosswise thereof so as to form a clearance space 5, as shown in Fig. 7. The pan 16 also has similar holes 17 formed in the same way as the holes in the bottom 3 of the casing 1. The reason for making the holes 4 and 17 of greater diameter lengthwise of the heater than crosswise is to overcome great exactitude in manufacture. By reason of this construction there is no difficulty in easily assembling the elbows 27 in the holes 4 of the casing bottom 3, and pressing split spring rings 30, shown in Fig. 9, over the shoulders 29 into the grooves 44 which are formed on the upper end of the elbows 27 between the flanges 28 and shoulders 29. The holes 17 of the pan 16 are then placed over the smaller diameter projections 43 of the elbows 27. After this the heating element heads 33 are set against the bottom of pan 16, as shown in Fig. 9, so that the tubular projections 42 of the heads 33 will surround the projections 43 of the elbows and thus hold the pan 16 tightly in place so as to make a gas tight joint between the pan 16 and the parts 42 and 43 when the bolts 32, shown in Fig. 1, hold the parts assembled.

These bolts pass through the upper wall of the heads 33 downward through the inner end of the elbows 27 into threaded bosses 31.

The heating element as exemplified in the drawings may have the heads 33 cast hollow to form chambers 34. These chambers connect directly with the elbows 27 and they are provided with lateral openings into which the radiating tubes 40 enter. These tubes near their ends have secured thereon tube spacing plates 38 which are made gas tight where they surround the tubes.

The tubes 40, shown in Fig. 2, and the plates 38 constitute a unitary structure which is readily assembled on the heads 33 with gaskets 37 therebetween. The plates 38 are tightly held against the gaskets 37 by means of horizontal bolts 39, shown in Fig. 2. These bolts pass through the outer wall and through the inner wall 36 of the heads 33 and into threaded openings of the plates 38. When the heads 33 are assembled on the unitary tubular heat radiating element the whole becomes a unitary heater element which, as stated, is assembled as a unit within the pan 16 on the elbows 27 by means of bolts 32. The bolts 32, 39 and 26 are made gas tight by close fitting or otherwise, in any desired manner.

A floor grating 21 rests on the flanges 2 of the casing 1. It has a beveled border 22 provided with openings 23 of any suitable shape or size which act as inlets for the cold air from the car. The center or flat top 24 of the grating has any desired number and shape of openings 25 in it through which the heated air passes into the car.

As shown in Fig. 2, the heating element fits closely within the side and end walls of the pan 16. The heads 33 have heat radiating fins formed thereon, as shown in Fig. 2. These fins form air circulating passages between the heads 33 and the end walls of the pan 16. To secure a greater heat radiating surface for the plain tubes 40, shown in Fig. 1, ribbons 41 of thin copper may be wound spirally around them where they are held by dipping an entire tube and its ribbon into melted spelter which securely joins the inner edge of the ribbon to the tube. To still further increase the radiating surface the ribbons 41 are corrugated radially, as shown at "A" in Fig. 8.

I make provision for cleaning out the bottom of the casing by means of folding doors 9 which close two lengthwise openings 6 formed in the bottom 3 of the casing 1. Between the opening 6 a lengthwise upwardly curving arch 7 is formed to stiffen this narrow strip of the bottom 3. This forms an upwardly extending groove in which the pivoted door holding bar 13 may rest when the bar is turned lengthwise of the heater, as shown in dotted lines in Fig. 1. When the bar 13 stands crosswise, the doors 9 are held closed. Each door has a lengthwise downward depending groove 10 formed therein which at the center of the groove is discontinued so as to form a recess 12 into which the ends of the arm 13 seat themselves.

The arm 13 is pivoted to the bottom end of the door operating bolt 14 which passes through a hole in the narrow strip 7 of the bottom 3 and extends upwardly through the grating 21 where it terminates in a slotted head approximately flush with the upper surface of the grating. Below the head of the bolt 14 a suitable pin and washer 48 are placed and between the washer and the strip 7 a spring 15 surrounds the bolt. This spring serves to constantly hold the arm 13 in engagement with either the portion 7 of the bottom 3 or the doors 9 according to the direction in which the arm is positioned. By means of the slotted head of the bolt 14 it is readily turned on its center over an angle of 90 degrees to open the doors 9 so that the vibration of the car will quickly shake out any dirt that may have accumulated in the bottom of the pan.

Figure 6:
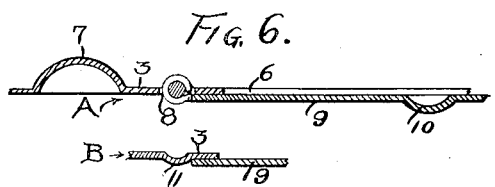
Fig. 6 is a detached cross section of a hinge for the clean-out door at A and a detail in section of the door edge and casing at B.

By turning the bolt 14 a similar distance in the reverse direction the doors 9 are again closed and held against rattle by means of the spring 15. Around the opening 6 of the bottom 3 beads 11 are formed, as shown at "B" of Fig. 6, to define the seating relation of the doors. Hinge openings 8 are formed in the narrow strip 7 through which hinges of the doors pass, as shown at "A" in Fig. 6. Suitable pins pass through the door hinges and project beyond the openings 8 where their ends rest in the grooves formed by beads 11.

The bottom of the pan 16 shown in Fig. 4 has two lengthwise slots 18 formed therein through which air has access to the heating tubes 40. A narrow strip 19 separates these openings and a hole 20 to form a clearance opening for the bolt 14 and spring 15. The heater is applied to the exhaust pipe 45 of the engine so as to form a by-pass for the exhaust gases which are controlled by any desired form of butterfly valve 46 and a floor button 47, so as to cause more or less of the exhaust gases to pass through the heater, or to completely exclude the gases from the heater.

The cold air from the car passes down through openings 23 into the space between the walls of the pan 16 and casing 1, up through openings 18 of the pan 16 into contact with the tubes 40 and thence out through the grating openings 25. As shown in Fig. 5 it will be seen there is no connection between the pan 16 and the grating 21. In fact, one of the great conveniences of the heater is found in the fact that the grating 21 can be entirely removed without disturbing the rest of the heater parts. In addition the pan 16 with its tightly fitting heating elements also constitutes a unitary structure and as such is claimed in its broadest relation.

It will be readily seen that the elbows 27 are universally adjustable on a horizontal plane without in any way dismantling the heater. This makes it exceedingly easy to install the heater regardless of the location in which the exhaust pipe of a car is found. It is of course understood that the heater itself resting on the floor of the car by means of the flange 2 may be secured to the floor through such flange in any desired manner.

The tubes 40, as stated, are held by the plates 38 so as to form a unit ready for assembling purposes. The tubes, usually of copper, brass, etc., or of any material which rapidly radiates heat are made gas tight in the plates 38 by subjecting their ends simultaneously or otherwise to pressure so as to force the metal back onto itself externally of each tube to make a gas tight joint. These tubes may extend through the asbestos gaskets 37 into the inner wall 36 of the heads 33 or they may only pass through the plates 38 as desired.

On account of the heat to which the tubes 40 are subjected, it is important that the continuous fins 41 are secured to them by means of a spelter or otherwise that has a melting point higher than the temperature of the exhaust gases which are supplied to the heater, so as to prevent the loosening of such "fins". I do not, however, limit my invention as a whole to the use of these or other kinds of radiating surfaces because for certain purposes I may use plain tubes.

In this connection it is very desirable that the inside of the tubes should be quite smooth so as to prevent the rapid adherence of carbon. Whenever it is necessary to clean the tubes, one only need remove the heater from the car floor, take out the screws 26 and 32, lift off the grating 21, pull out the heater unit 33—40 and detach the heads 33 by taking out the screws 39 when the entire inside of all the heater passages is exposed for easy cleaning. The reassembling is done in reverse order making the entire operation quite simple and effective.

What I claim is:

1. In automobile heaters, an outer casing, an inner pan, a heating unit within the pan, a pair of elbows projecting through the casing and the pan and connecting with the interior of the heating element, a grating supported by the casing, and means for holding the heating element, pan, casing, and elbows in assembled relation.

2. In automobile heaters, a casing, a heating element within the casing and spaced apart from the bottom of the casing, a pair of elbows terminating within the casing in engagement with the heating element said elbows being pivoted on the casing for universal adjustment on a horizontal plane, and means for holding the heating element, casing and elbows in engagement with each other.

3. In automobile heaters, a suitable casing having openings through the bottom near the ends thereof, a pan having similar openings through its bottom, means for registering the openings of the pan with those of the casing to hold the casing and pan spaced apart, a heating element constituting a unitary structure within the pan and connected with the separating means which hold the casing and pan spaced apart from each other.

4. In automobile heaters, a suitable casing having side and end walls and a bottom therefor, a pan having side and end walls of smaller dimension than the side and end walls of the casing, a heating unit contained in the pan, pivoted elbows below the casing, and means for holding the pan and casing in assembled relation between the heating unit and the elbows.

5. In automobile heaters, a suitable casing having a cleanout exit in its bottom, a closure for the exit, a pan held in spaced apart relation from the casing said pan having an opening in its bottom, an exterior flange formed around the upper edge of the casing, a grating attached to the flange the upturned sides of the pan terminating closely beneath the grating, and means operable from approximately the center of the grating for operating the closure for the exit of the casing.

6. In automobile heaters, an attaching elbow comprising a plurality of flanges at one end thereof forming a groove therebetween, and a reduced diameter termination of the elbow beyond the flanges.

7. In automobile heaters, a suitable casing having circular openings near the ends of the bottom of the casing, a pan having similarly positioned openings in the bottom thereof the pan and casing being spaced apart from each other on the side ends and bottom, the said openings being larger in diameter lengthwise of the pan and casing than crosswise thereof, pivoted elbows passing through the openings of the pan and casing and projecting above the pan bottom, a heating unit seated on said projections, and means for holding the heating unit and elbows in assembled relation with the pan and casing positioned between them.

8. In automobile heaters, a heating element comprising a plurality of plain ended tubes, a plate at each end of the tubes to which the latter are attached in a gas tight manner, open chambers at each end of the tubes, and means for holding the chambers in engagement with the plates, said means extending through both walls of the chambers into the plates and being accessible from the outside of the chambers.

9. In automobile heaters, a casing having openings in its bottom, a heat radiating element therein, connecting elbows secured to the casing in register with the inlet and outlet of the heating element, flanges on the elbows adapted to engage the bottom of the casing around the openings thereof, extensions of the elbows projecting through the openings of the bottom, annular grooves formed around said extensions, and split spring rings in the grooves for holding the elbows in adjustable relation on the casing.

In testimony whereof I affix my signature.

HERBERT B. TYLER.